US010866716B2

(12) United States Patent
Sinclair et al.

(10) Patent No.: US 10,866,716 B2
(45) Date of Patent: Dec. 15, 2020

(54) SYSTEM AND METHOD FOR PROVIDING HIGHLY PERSONALIZED INFORMATION REGARDING PRODUCTS AND SERVICES

(71) Applicants: Hillary New Sinclair, Ennis, MT (US); Chandra Nagaraja, San Francisco, CA (US)

(72) Inventors: Hillary New Sinclair, Ennis, MT (US); Chandra Nagaraja, San Francisco, CA (US)

(73) Assignee: Wheesearch, Inc., Redwood City, CA (US)

( * ) Notice: Subject to any disclaimer, the term of this patent is extended or adjusted under 35 U.S.C. 154(b) by 0 days.

(21) Appl. No.: 16/378,345

(22) Filed: Apr. 8, 2019

(65) Prior Publication Data
US 2020/0319784 A1    Oct. 8, 2020

Related U.S. Application Data

(60) Provisional application No. 62/829,304, filed on Apr. 4, 2019.

(51) Int. Cl.
*G06F 3/0484* (2013.01)
*G06F 16/9535* (2019.01)
(Continued)

(52) U.S. Cl.
CPC ........ *G06F 3/04847* (2013.01); *G06F 3/0482* (2013.01); *G06F 3/04817* (2013.01);
(Continued)

(58) Field of Classification Search
CPC .................................................. G06F 3/04847
(Continued)

(56) References Cited

U.S. PATENT DOCUMENTS

| 7,996,282 B1 | 8/2011 | Scott et al. |
| 8,265,351 B2 | 9/2012 | Aarabi |

(Continued)

FOREIGN PATENT DOCUMENTS

| CA | 2651539 C | 7/2016 |
| EP | 002760041 | 8/2015 |

(Continued)

OTHER PUBLICATIONS

Ablavatski et al., "Real-Time AR Self-Expression with Machine Learning," Google AI Blog (https://ai.googleblog.com/2019/03/real-time-ar-self-expression-with.html), 6 pp. (2019), printed Jun. 22, 2020.

(Continued)

*Primary Examiner* — Reza Nabi
(74) *Attorney, Agent, or Firm* — Arnold & Porter Kaye Scholer LLP

(57) ABSTRACT

Systems and methods allow a user to input user attributes, to search for products or services, and to receive recommendations concerning items, such as products or services, based on the user attributes. A user may provide opinion information with respect to particular attributes of products or services, and may easily view and understand others' opinions regarding those particular attributes. A user may participate in a live consultation session with a person having particular knowledge with respect to a product or service. Accordingly, a user may receive highly personalized information with respect to products or services.

8 Claims, 13 Drawing Sheets

(51) Int. Cl.
*G06F 16/9538* (2019.01)
*G06F 3/0482* (2013.01)
*G06T 11/00* (2006.01)
*H04N 7/14* (2006.01)
*G06T 11/60* (2006.01)
*G06F 3/0481* (2013.01)

(52) U.S. Cl.
CPC ...... *G06F 16/9535* (2019.01); *G06F 16/9538* (2019.01); *G06T 11/001* (2013.01); *G06T 11/60* (2013.01); *H04N 7/141* (2013.01); *G06T 2200/24* (2013.01)

(58) Field of Classification Search
USPC ....................................................... 715/758
See application file for complete search history.

(56) References Cited

U.S. PATENT DOCUMENTS

| | | | |
|---|---|---|---|
| 8,620,038 B2 | 12/2013 | Aarabi | |
| 8,660,319 B2 | 2/2014 | Aarabi | |
| 8,711,175 B2* | 4/2014 | Aarabi | G09G 5/026 345/629 |
| 8,725,560 B2* | 5/2014 | Aarabi | G06Q 30/0276 |
| 8,910,082 B2* | 12/2014 | Aarabi | G06F 3/0482 715/834 |
| 9,687,155 B2* | 6/2017 | Aarabi | A61B 5/6898 |
| 9,760,935 B2* | 9/2017 | Aarabi | G06Q 30/0631 |
| 9,928,601 B2* | 3/2018 | Aarabi | G06T 7/11 |
| D818,477 S | 5/2018 | Hoffman et al. | |
| 9,965,778 B2 | 5/2018 | Aarabi | |
| D829,739 S* | 10/2018 | Lavin, Jr. | D14/486 |
| 10,158,827 B2* | 12/2018 | Cahill | H04N 7/152 |
| D840,423 S | 2/2019 | Narinedhat et al. | |
| D851,099 S | 6/2019 | Uppala et al. | |
| 10,318,534 B2 | 6/2019 | Pinckney et al. | |
| 10,395,436 B1* | 8/2019 | Li | G06T 7/75 |
| D864,992 S | 10/2019 | Uppala et al. | |
| 10,431,010 B2* | 10/2019 | Yang | G06T 19/006 |
| 10,445,938 B1* | 10/2019 | Poliakov | G06T 19/006 |
| 10,482,517 B2* | 11/2019 | Szymczyk | G06F 3/04817 |
| 10,553,006 B2* | 2/2020 | Iglehart | G06K 9/00221 |
| 10,559,019 B1* | 2/2020 | Beauvais | G06T 19/006 |
| 10,565,741 B2* | 2/2020 | Aarabi | G06K 9/00228 |
| 2004/0044589 A1* | 3/2004 | Inoue | G06Q 30/0643 705/27.2 |
| 2005/0210393 A1* | 9/2005 | Maeng | G06Q 10/10 715/751 |
| 2007/0242066 A1* | 10/2007 | Levy Rosenthal | H04N 7/15 345/419 |
| 2009/0202114 A1* | 8/2009 | Morin | A63F 13/213 382/118 |
| 2012/0236103 A1* | 9/2012 | Cahill | H04N 7/147 348/14.01 |
| 2013/0335416 A1* | 12/2013 | Coon | G06T 17/20 345/423 |
| 2014/0085400 A1* | 3/2014 | Kaus | H04N 7/18 348/14.03 |
| 2015/0293382 A1* | 10/2015 | Jethmalani | G02C 13/003 351/204 |
| 2015/0309720 A1* | 10/2015 | Fisher | G06F 3/04842 715/752 |
| 2016/0035133 A1* | 2/2016 | Ye | G06T 19/006 345/419 |
| 2016/0042443 A1* | 2/2016 | Osada | G06T 11/60 705/27.2 |
| 2016/0042557 A1* | 2/2016 | Lin | G06T 7/73 345/426 |
| 2016/0042564 A1* | 2/2016 | Osada | G06Q 30/0643 345/632 |
| 2016/0063592 A1* | 3/2016 | Szymczyk | G06F 3/017 705/26.61 |
| 2016/0241498 A1* | 8/2016 | Senjo | H04L 51/046 |
| 2017/0024589 A1* | 1/2017 | Schumacher | G06F 3/0481 |
| 2017/0323180 A1* | 11/2017 | Aarabi | G06K 9/6857 |
| 2017/0358116 A1* | 12/2017 | Cheng | G06K 9/00281 |
| 2018/0075523 A1* | 3/2018 | Sartori Odizzio | G06Q 30/0643 |
| 2018/0075524 A1* | 3/2018 | Sartori Odizzio | G06Q 30/0643 |
| 2018/0165855 A1* | 6/2018 | Cheng | G06T 7/11 |
| 2018/0295079 A1* | 10/2018 | Longo | H04L 51/24 |
| 2018/0300589 A1* | 10/2018 | Levinshtein | G06K 9/00268 |
| 2019/0026013 A1* | 1/2019 | Aarabi | G06F 3/04845 |
| 2019/0066348 A1* | 2/2019 | Jennings | A45D 44/005 |
| 2019/0244015 A1* | 8/2019 | Lee | G06T 11/60 |
| 2019/0246065 A1* | 8/2019 | Lee | G06Q 30/02 |
| 2019/0250802 A1* | 8/2019 | Schenck | G06F 3/011 |
| 2019/0311540 A1* | 10/2019 | Kovacevitch | G06T 19/006 |
| 2020/0106813 A1* | 4/2020 | Vendrow | G06F 16/48 |
| 2020/0111148 A1* | 4/2020 | Soni | G06Q 30/0631 |
| 2020/0137353 A1* | 4/2020 | Stewart | H04L 67/00 |
| 2020/0219326 A1* | 7/2020 | Goldberg | G06T 19/006 |

FOREIGN PATENT DOCUMENTS

| | | |
|---|---|---|
| EP | 003410851 | 10/2016 |
| FR | 3062739 A1 | 8/2018 |
| WO | 2019/028549 A1 | 2/2019 |
| WO | 2019/079895 A1 | 5/2019 |

OTHER PUBLICATIONS

Alaimo, "YouCam Makeup Combines AI, AR for Beauty 3.0," RetailDive (https://www.retaildive.com/news/youcam-makeup-combines-ai-ar-for-beauty-30/542570/), 3 pp. (2018), printed Jun. 22, 2020.

Hale, "YouTube Will Debut Augmented Reality Ads that Let Users Virtually Try on Lipsticks (Report)," TubeFilter (http://www.tubefilter.com/2019/05/31/youtube-advertising-augmented-reality-google-shopping-video-ads-creators/), 5 pp. (2019), printed Jun. 22, 2020.

Hartmans, "I Learned How to Apply Makeup Using a Futuristic New Feature on Sephora's App—Here's What Happened," *Business Insider*, https://www.businessinsider.com/sephora-visual-artist-app-feature-teaches-how-to-apply-makeup-using-ai-photos-2017-3?utm_source=copy-link&utm_medium=referal&utm_content=topbar, published Mar. 18, 2017, printed Jun. 16, 2020.

Luber, "Immersive Branded Experiences in YouTube and Display Ads," Google Marketing Platform (https://blog.google/products/marketingplatform/360/immersive-branded-experiences-youtube-and-display-ads/), 6 pp. (2019), printed Jun. 22, 2020.

Meitu, Inc, History (https://corp.meitu.com/en/about/history/), 4 pp. (2019), printed Jun. 22, 2020.

Meitu, Inc., "Meitu Launches AR Makeup Counter Experience in MakeupPlus," Meitu Company News (https://corp.meitu.com/en/news/news/66.html), 3 pp. (2017), printed Jun. 22, 2020.

ModiFace, http://modiface.com/, 5 pp. (2019), printed Jun. 23, 2020.

Moon, "L'Oreal Buys and Augmented Reality Beauty App Maker: Modiface Will Make 'Digital Experiences' for Brands Like Lancôme and YSL," Engadget (https://www.engadget.com/2018-03-18-loreal-buys-modiface.html), 10 pp. (2018), printed Jun. 22, 2020.

O'Leary, "Meitu's BeautyPlus Selfie-Perfecting App Just Got Some Fun AR Filters," NextReality (https://next.reality.news/news/meitus-beautyplus-selfie-perfecting-app-just-got-some-fun-ar-filters-0176938/), 5 pp. (2017), printed Jun. 22, 2020.

Parker, "New UI Tools and a Richer Creative Canvas Come to ARCore," Google Developers Blog (https://developers.googleblog.com/2019/02/new-ui-tools-and-richer-creative-canvas.html), 5 pp. (2019), printed Jun. 22, 2020.

Toombs, "YouTube is Working on AR-Powered Makeup Samples for Beauty Shoppers [APK Teardown]," Android Police (https://www.androidpolice.com/2019/05/30/youtube-is-working-on-ar-

(56) References Cited

OTHER PUBLICATIONS powered-makeup-samples-for-beauty-shoppers-apk-teardown/), 6 pp. (2019), printed Jun. 22, 2020.

\* cited by examiner

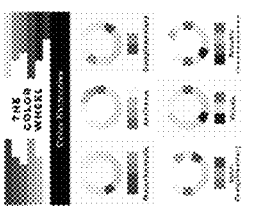
FIG. 9

SYSTEM AND METHOD FOR PROVIDING HIGHLY PERSONALIZED INFORMATION REGARDING PRODUCTS AND SERVICES

RELATED APPLICATIONS

The present patent document claims the benefit of priority of U.S. Provisional Patent Application No. 62/829,304, entitled "System and Method for Providing Highly Personalized Information Regarding Products and Services," filed Apr. 4, 2019, the content of which is incorporated by reference herein in its entirety.

FIELD

The present patent document relates generally to systems and methods for providing highly personalized information regarding products and services.

BACKGROUND

Presently, numerous websites collect and present product reviews, but nearly all do so via a combination of star reviews and free form text. Star reviews generally consist of a reviewer rating on a scale of 1 to 5, and are often accompanied by textual information provided by the reviewer. This "star-and-paragraph" review method, while ubiquitous, is imprecise and prone to manipulation because of its inherent subjectivity. A star review is a single, overall judgment of a product, yet each reviewer may issue its judgment based on completely different reasons and standards, which may or may not be reflected in the review text. Furthermore, even if the accompanying review text includes a specific reason for a star rating, the reason is not identifiable in a conventional review unless it is closely read by a reader. Accordingly, star reviews can be entirely manipulative, which has often proven to be the case on large retail sites.

Understanding star reviews is complicated and time consuming. Numerical values associated with star reviews are ambiguous, and people who hope to rely on such reviews are often presented with thousands of paragraphs, which are impossible to appreciate completely. Moreover, people are generally unaware of how much they and a reviewer may have in common, and are generally unaware of what aspects of a product a reviewer believes are important. Accordingly, whether a reviewer believes that a product is satisfactory often has little bearing on whether a reader of a review will also find that product satisfactory.

Furthermore, sites at which people can read reviews for various products are customarily devoid of information on how those products are to be used. At sites that do provide information, such as instructions, on how to use certain products, the instructions are often inapplicable to certain people, due to those people's particular characteristics or circumstances. Instructional videos, for example, are generally not accompanied by searchable information to match people's individual preferences, or characteristics, such as complexion, coloring, physicality, or sensitivities. In the current environment in which thousands of instructional videos exist for a plethora of products, people often waste a significant amount of time searching for instructional videos that are applicable to their particular characteristics or circumstances, but are always a step removed due to the fact that the videos are specific to the video creator, and not to the audience's individual characteristics.

SUMMARY

Systems and methods are disclosed for providing highly personalized information regarding products or services that is quick and easy for a person that desires such information to understand. Rather than incorporating a single, catch-all star rating paired with open-ended text, embodiments described herein incorporate the evaluation of specific criteria or attributes pertaining to products and services.

In accordance with embodiments, specific attributes that are important to users of a particular product or category of products are identified. Such attributes may be identified by way of crowd-sourcing, targeted market research, or other analytic methods. For each product attribute, users are asked to rate the performance of a product within a range of possible extremes. Ratings are received and leveraged to provide the highest level of personalization by matching users with products based on user profiles and what they have indicated they want out of a product.

In accordance with embodiments, users may create accounts by providing information about themselves. That information may be used by the system to identify products and content that meet user needs, and to develop better matching rules for all users. The system may recommend products and other content to users based on the users' explicit preferences. The more users that utilize the system and provide opinions with respect to products, the more exact and personal the system's recommendations become.

In accordance with embodiments, users may select a product category, and the system may provide relevant criteria or attributes for that product category, and users may share their opinions with respect to products in that category. The system may then cross reference user opinion and user profile information to classify and recommend products for other users. Users may read attribute-specific summarizations for each product to see how much or how little a particular product has of that attribute.

In accordance with embodiments, both design and utility may be incorporated. The design may be in the use of sliders for input, the sliders bearing clearly differentiable icons to denote and reinforce attributes that the sliders represent, and the use of concentric radial indicators having different colors and centered around icons that match those of the sliders to present information inputted via sliders in a way that is familiar to users and easy for them to understand. The utility may be in the use of sliders for each attribute deemed to be relevant to each product. Obtaining user opinions in this way eliminates incentives to game reviews, as each opinion is inherently a value-neutral judgment, without ambiguity as to what it represents.

In accordance with embodiments, a crowd-sourced, live marketplace takes the guesswork out of shopping by helping consumers find the perfect products, and by teaching them how to use those products via searchable videos or via consultants who offer live, personalized consultation sessions. Searching, watching, learning, and live engagement, are combined in one entertaining platform.

In accordance with an embodiment related to beauty products, if a user with combo skin and a caramel skin tone with an olive undertone provides an opinion that a particular foundation product has good coverage, is not streaky, and does not trigger an acne alert, then the system may recommend that foundation product to another user with those same skin characteristics and who is also looking for a foundation product with good coverage, that is not streaky, and that is not acne inducing.

In accordance with an embodiment related to beauty products, if smell is an attribute for a particular product type, then users may be asked to rate the smell of a product between having no smell and having a very strong smell. Users may use a slider to approximate a value for their rating, and the average rating of all users (or a select group of users) is presented via one or more concentric radial indicators to allow users to view a summary of opinions concerning the product's smell in a visually appealing, familiar design paradigm.

In accordance with an embodiment, a system may include a graphical user interface configured to allow a user to conduct a search for an item, may include a plurality of graphical user interface input elements, each graphical user interface element corresponding to an attribute of the item, and may include a plurality of graphical indicators, each graphical indicator corresponding to one of the attributes of the item. Each graphical user interface input element may allow the user to input a value associated with the corresponding item attribute, and each graphical indicator may reflect the value associated with the corresponding item attribute.

In accordance with an embodiment, each graphical user interface input element may include a slider having an icon that represents the corresponding item attribute. Each graphical indicator may include an icon that represents the corresponding item attribute, and each graphical indicator may include a radial indicator that reflects the value associated with the corresponding item attribute. Each graphical indicator may further include a second radial indicator that reflects a second value associated with the corresponding item attribute. The second value may be determined based on input, associated with the corresponding item attribute, from a plurality of users.

In accordance with an embodiment, the graphical user interface may allow the user to input user information consisting of values associated with one or more user attributes. The graphical user interface may display search results, and the content or order of the search results may be determined based, at least in part, on the user information. The content or order of the search results may be determined based, at least in part, on values, associated with item attributes, that have been inputted by other individuals having user information that is the similar to that of the user. The graphical user interface may allow the user to conduct a search for a video related to the item.

In accordance with an embodiment, a graphical user interface may allow a user to establish a live video session between the user and a consultant. During the live video session, the user may view live video of the consultant on a user's user device, the consultant may view live video of the user on a consultant's user device. In accordance with an embodiment, the consultant may alter an image of the user via the consultant's user device, and the user may view the altered image of the user via the user's user device.

In accordance with an embodiment, a consultant may draw marks on the image of the user, or may apply colors to the image of the user. The user may view a rendering of themself (the user) using or wearing particular products, styles, or techniques, and may view a rendering of themself in a virtual setting.

In accordance with an embodiment, the system may incorporate augmented reality.

In accordance with an embodiment, the system may include a graphical user interface having a plurality of graphical user interface input elements, each graphical user interface element corresponding to an attribute of a consultant or a user, and a plurality of graphical indicators, each graphical indicator corresponding to one of the attributes of the consultant or the user. Each graphical user interface input element may allow the user or the consultant to input a value associated with the corresponding consultant or user attribute, and each graphical indicator may reflect the value associated with the corresponding consultant or user attribute. Each graphical user interface input element may include a slider having an icon that represents the corresponding consultant or user attribute. Each graphical indicator may include an icon that represents the corresponding consultant attribute or user attribute, and each graphical indicator may include a radial indicator that reflects the value associated with the corresponding consultant or user attribute.

BRIEF DESCRIPTION OF THE DRAWINGS

The accompanying drawings, which are included as part of the present specification, illustrate the presently preferred embodiments and, together with the general description given above and the detailed description given below, serve to explain and teach the principles of the systems and methods described herein.

FIG. 9 shows a consultation scheduling GUI in accordance with embodiments of the invention.

The figures are only intended to facilitate the description of the various embodiments described herein. The figures do not describe every aspect of the teachings disclosed herein and do not limit the scope of the claims.

DETAILED DESCRIPTION

The following description is presented to enable any person skilled in the art to create and use systems and methods for providing users with highly personalized information regarding products and services in a manner that is quick and easy for users to understand.

Figure 1:
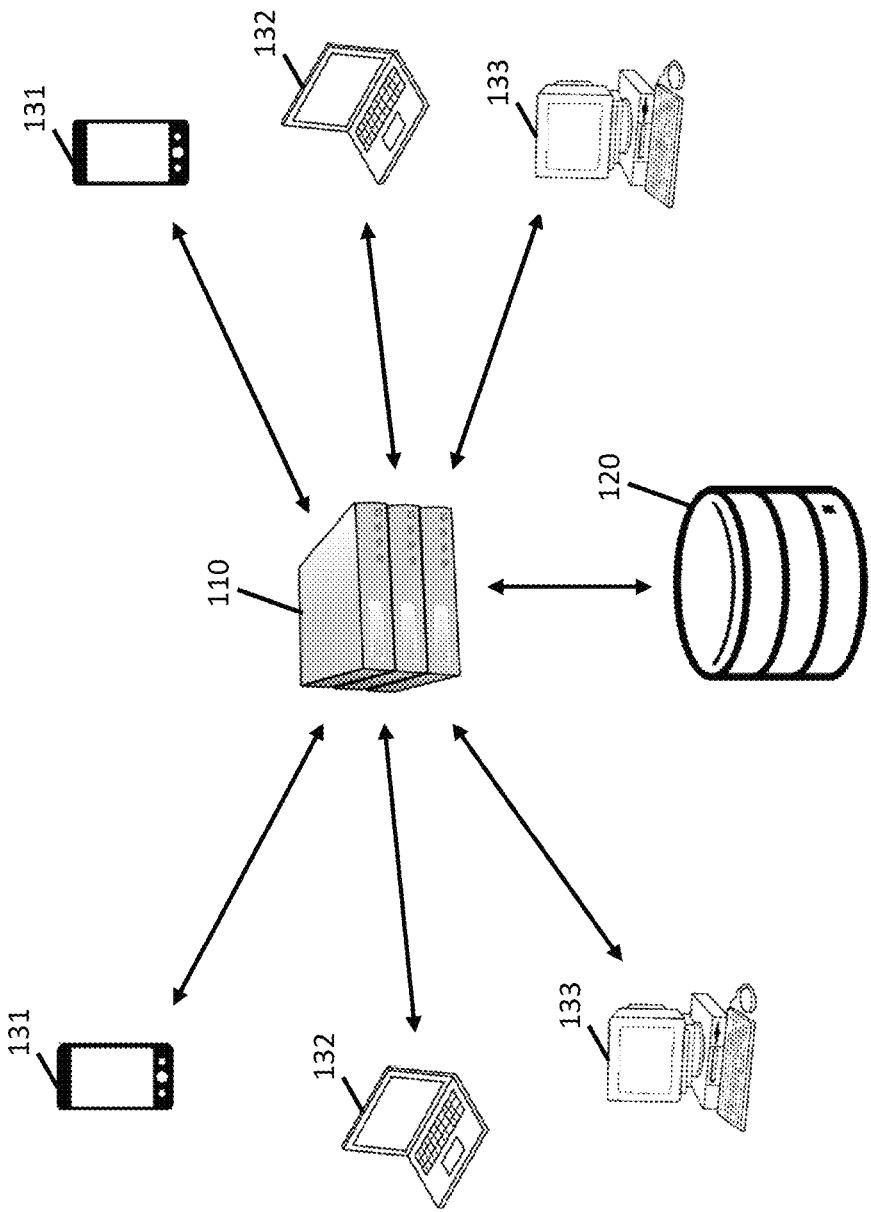
FIG. 1 shows an overview of a system and various components thereof in accordance with embodiments of the invention.

FIG. 1 shows an overview of a system capable of allowing users to search for various products or services, to review the opinions of others concerning those products or services, to provide their own opinions concerning those products or services, and to receive live instruction on how to use those products or services, in accordance with an embodiment.

In accordance with an embodiment, the system may include a service provider 110 to facilitate the communication of information to and from users. The service provider 110 may include one or more servers having hardware and software configured to store and process information, and to communicate with other system components to achieve the functionality described herein.

The system may include one or more databases 120 in communication with the service provider 110. A database 120 may store information to be used in accordance with the system. Such information may include, for example, user information (e.g., user profiles), product information, opinion information concerning various products, videos containing information about those products, product usage data, service offerings, and product and video metadata.

The system may include user devices that allow for the storage and processing of information, and for communication with the service provider 110 and with each other. Such user devices may include mobile devices 131 such as cellular phones, tablets, personal data assistants, laptop computers 132, and desktop computers 133, and the like. Mobile devices 131 may include operating system software such as iOS, Android, or other operating system software. Laptop computers 132, and desktop computers 133 may include operating system software such as Windows, Linux, Mac OS, or other operating system software.

A user of the system may access information by way of a software application running on a user device. Such a software application may be, for example, a mobile app or a standalone desktop application. Alternatively, a user may access information by way of a web page displayed by a web browser application.

Figure 2:
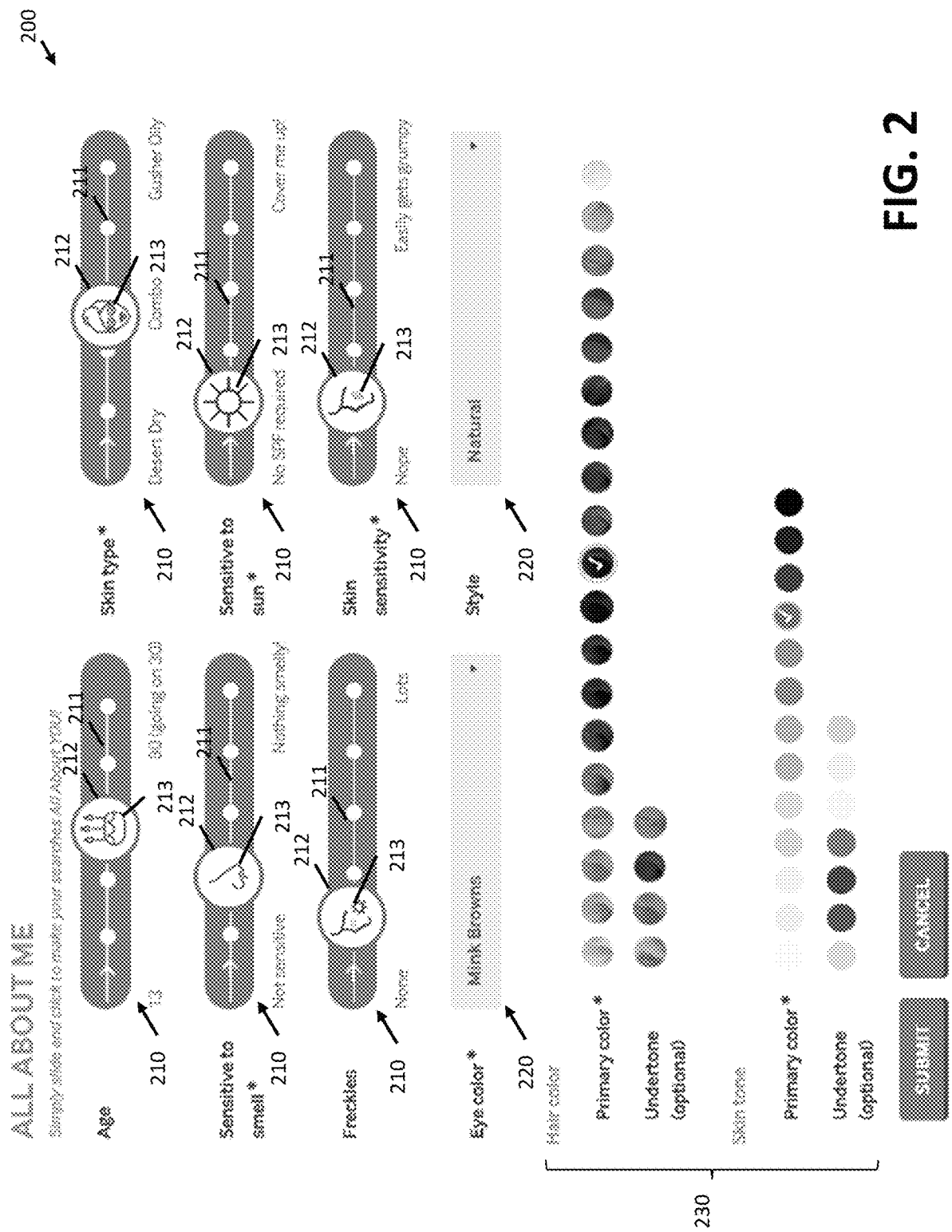
FIG. 2 shows a user profile GUI (graphical user interface) in accordance with embodiments of the invention.

Turning to FIG. 2, illustrated therein is a user profile GUI 200, in accordance with an embodiment. The user profile GUI 200 allows a user to input information about themself upon registration with the system. (As used herein, the pronoun "themself" may refer to a single user, and the pronouns "their" and "they" may refer to a single user or to a plurality of users.) Various GUI input elements, such as sliders 210, drop-down menus 220, and radio buttons 230, may be displayed in the user profile GUI 200, each GUI input element corresponding to an attribute of the user.

A slider 210 includes a track 211 and a handle 212, and may further include an icon 213, which may be displayed on the handle 212. The icon 213 may provide a graphical representation of the particular attribute to which the slider 210 corresponds. For example, a slider 210 corresponding to an "age" attribute may include an icon 213 that resembles a birthday cake. A slider 210 may allow for a user to input any value within a continuous range between minimum and maximum extremes, or may allow a user to input a value within a set of discrete values between minimum and maximum extremes.

In an embodiment related to beauty products, attributes of the user may include age, skin type, sensitivity to smell, sensitivity to sun, freckles, and skin sensitivity. A user may use sliders 210 to input values, each value associated with one of those attributes. Possible values for the age attribute may include several age ranges between 13 years and 80 years. Possible values for the skin type attribute may include dry, semi-dry, combo, or oily. Possible values for the sensitivity to smell, sensitivity to sun, and skin sensitivity attributes may include not sensitive, barely sensitive, moderately sensitive, or very sensitive. Possible values for the freckles attribute may include no freckles, few freckles, moderate, or lots of freckles. The user profile GUI 200 may include textual indicators to provide nicknames of each attribute value. For example, values of dry and oily may have the nicknames "desert dry" and "gusher oily," respectively, at the extremes, with selectable intermediate values therebetween.

In an embodiment related to beauty products, an additional attribute of the user may include style. A user may use a drop-down menu to input a value associated with that attribute. Possible values for the style attribute may include natural, every day, professional, seductive, glam, or costume.

In an embodiment related to beauty products, additional attributes of the user may include eye color, hair color (primary color and undertone), and skin color (primary color and undertone). A user may select a value for each of those attributes by selecting from a drop-down menu or from a group of radio buttons, for example. Drop-down menus 220 and radio buttons 230 may include values represented as text strings, or represented as images presented in different colors, for example.

During the registration process, or at any time a user wishes to update their profile information, the user's information may be received by the service provider 110 and stored in the database 120. Values may be stored in numerical form. A user may also provide additional information (e.g., contact information, profile picture, notes about the user) which may be received by the service provider 110 and stored in the database 120.

During the registration process, or at any time a user wishes to update their profile information, a user may identify themself as a creator, consultant, or as one who has particular knowledge with respect to a type of product or service. For example, a user may identify themself as one with particular knowledge with respect to beauty products. Such a user may, for example, provide a link to a channel (e.g., the user's YouTube channel) with videos that discuss, or provide instructions on how to use, certain products. Users may be allowed to tag products that appear in videos, and those products may become available in the system, allowing other users to search for, and to provide opinions on the products. Recognition by the system of a user as a creator or a consultant may require approval by the system.

During the registration process, or at another time, a user may provide payment information, such as credit card information or other account information, which may be received by the service provider 110 and stored in the database 120. Subsequently, the system may use the user's payment information to allow the user to obtain certain benefits of the system such as consultation sessions. Consultants, for example, may provide account information, which may be received by the service provider 110 and stored in the database 120. The system may use a consultant's account information to allow the consultant to receive payment for services, such as consultation sessions, that they provide for other users of the system. The system may use a consultant's account information to allow the consultant to receive payment for user subscriptions to content provided by the consultant, or to receive monetary tips.

Figure 3:
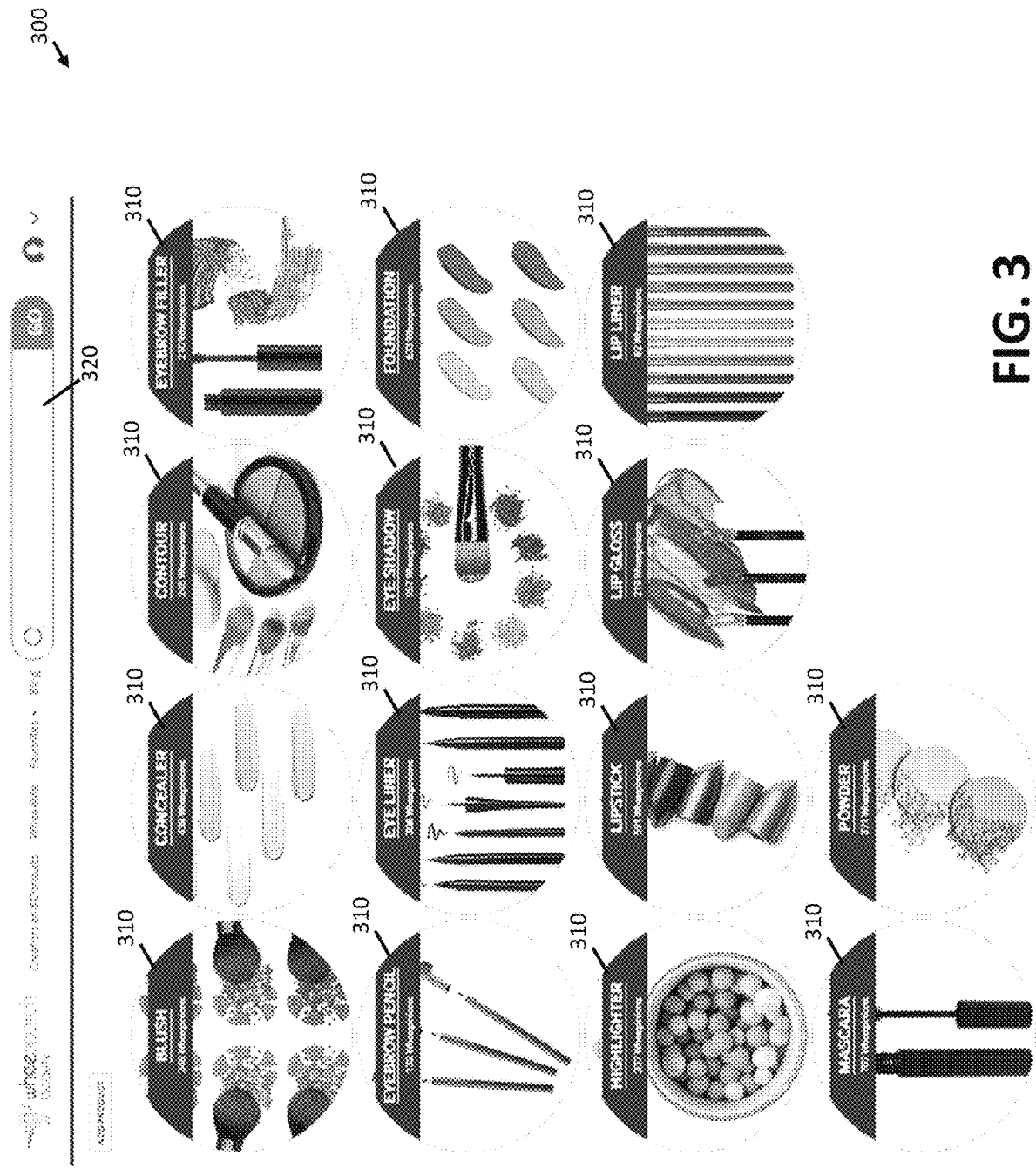
FIG. 3 shows a search GUI in accordance with embodiments of the invention.

Turning to FIG. 3, illustrated therein is a search GUI 300 in accordance with an embodiment. The search GUI 300 may include text, images, or both, representing several product categories 310. In an embodiment, product categories include blush, concealer, contour, eyebrow filler, eyebrow pencil, eye liner, eye shadow, foundation, highlighter, lipstick, lip gloss, lip liner, mascara, and powder. A user may select one of the product categories 310 to initiate a search for products within that category. The search GUI 300 may also include a search field 320 in which a user may input text, such as a product category name, product name, brand name, keyword, other information, or combination thereof, to initiate a search for products corresponding to the text.

Figure 4:
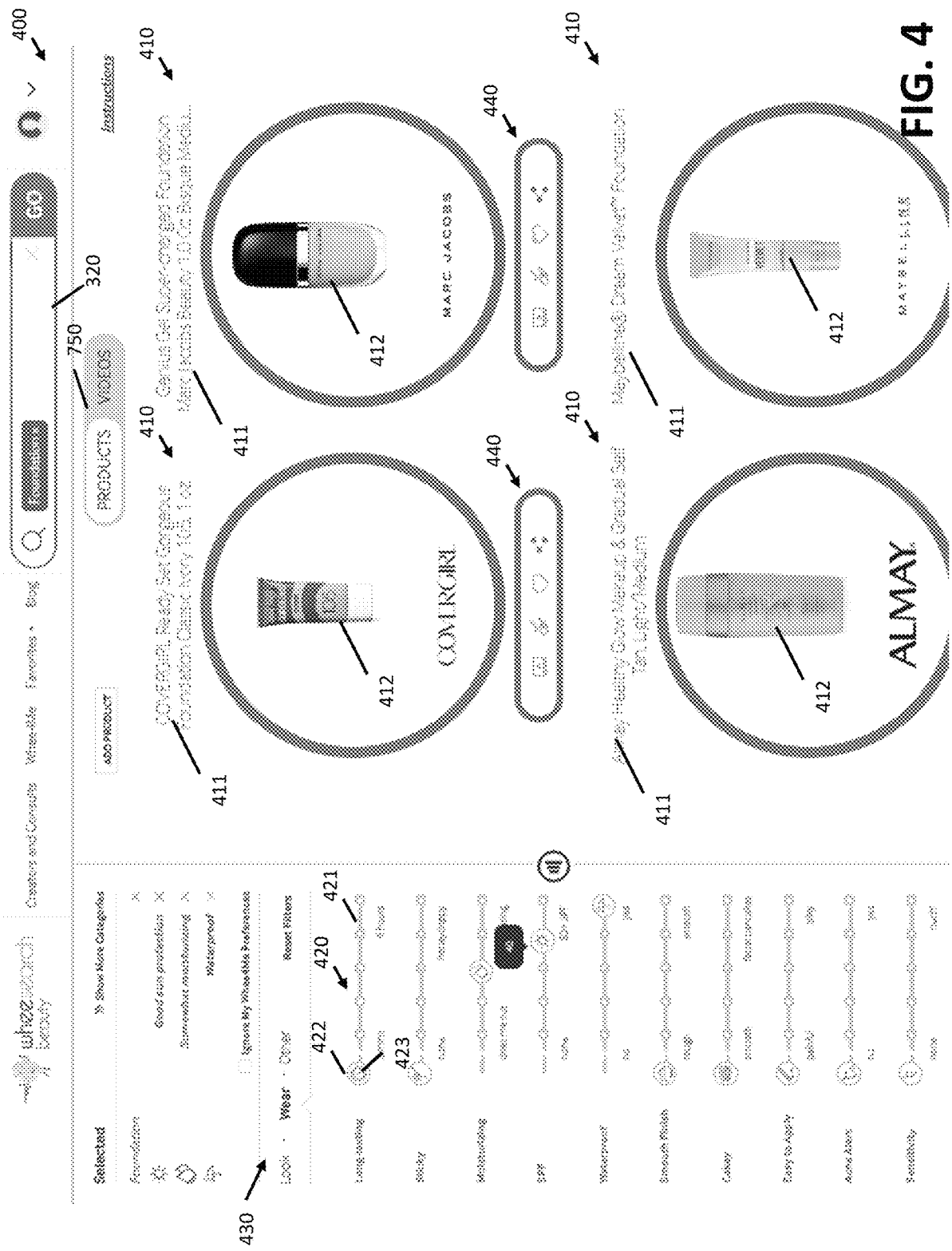
FIG. 4 shows a product search results GUI in accordance with embodiments of the invention.

Turning to FIG. 4, illustrated therein is a product search results GUI 400 in accordance with an embodiment. The product search results GUI 400 may include one or more products 410 that correspond to a search initiated by a user. In particular, the product search results GUI 400 may include text 411, an image 412, or both, associated with each product 410. The product search results GUI 400 may further include one or more filters, each associated with an attribute of the products identified via the search. Each filter may correspond to a GUI input element, such as a slider 420, which includes a track 421 and a handle 422, and may further include an icon 423, which may be displayed on the handle 422. The icon 423 may provide a graphical representation of the particular product attribute to which the slider 420 corresponds. For example, a slider 420 corresponding to a "long-lasting" product attribute may include an icon 423 that resembles a clock. A slider 420 may allow for a user to input any value within a continuous range between minimum and maximum extremes, or may allow a user to input a value within a set of discrete values between minimum and maximum extremes. A user may apply filters to search results by adjusting the sliders 420.

In an embodiment related to beauty products, a user may initiate a search for products within a "foundation" category using the search GUI 300, and several foundation products may be presented via the product search results GUI 400. Product attributes may include long-lasting, sticky, moisturizing, SPF, waterproof, smooth finish, cakey, easy to apply, acne alert, sensitivity, smell, coverage, and streaky. Due to the nature of certain product attributes, product attributes may be divided into several groups, and GUI input elements corresponding to the product attributes in each group may be displayed independently in the product search results GUI 400. The product search results GUI may include group links 430 that allow a user to select a group of product filter GUI input elements to be displayed. For example, sliders 420 for "coverage" and "streaky" product attributes may be displayed upon a user's selection of a link 430 corresponding to a "Look" group, while sliders 420 for others of the aforementioned product attributes may be displayed upon a user's selection of a link 430 corresponding to a "Wear" group.

Due to the nature of certain categories of products, the specific set of product attributes that may be presented via the product search results GUI 400 with respect to a category of products may be the same as, or may differ from, the specific set of product attributes that may be presented via the product search results GUI 400 with respect to another category of products. For example, in connection with lip gloss products, the product search results GUI 400 may display sliders 420 that correspond to "sparkly" and "shiny" product attributes, while such sliders 420 may not be displayed in connection with foundation products, as such product attributes are generally of more concern to users when shopping for lip gloss products, but of less concern to users when shopping for foundation products.

In accordance with an embodiment, a user may apply filters corresponding to additional product attributes such as price, brand, where to buy, seasons (e.g., the appropriate season(s) for use), life moment, cruelty-free, organic, or vegan. Users may apply such filters by adjusting, or inputting information into, GUI input elements such as sliders, radio buttons, drop-down menus, or check boxes.

In accordance with an embodiment, links 440 may be displayed in connection with each product 410. Links 440 may allow a user to take certain actions with respect to the product. For example, links 440 may allow a user to view videos associated with the product 410 (although not every product 410 is necessarily associated with a video), indicate that they own the product 410, indicate that they like the product 410, or share information regarding the product 410.

Figure 5:
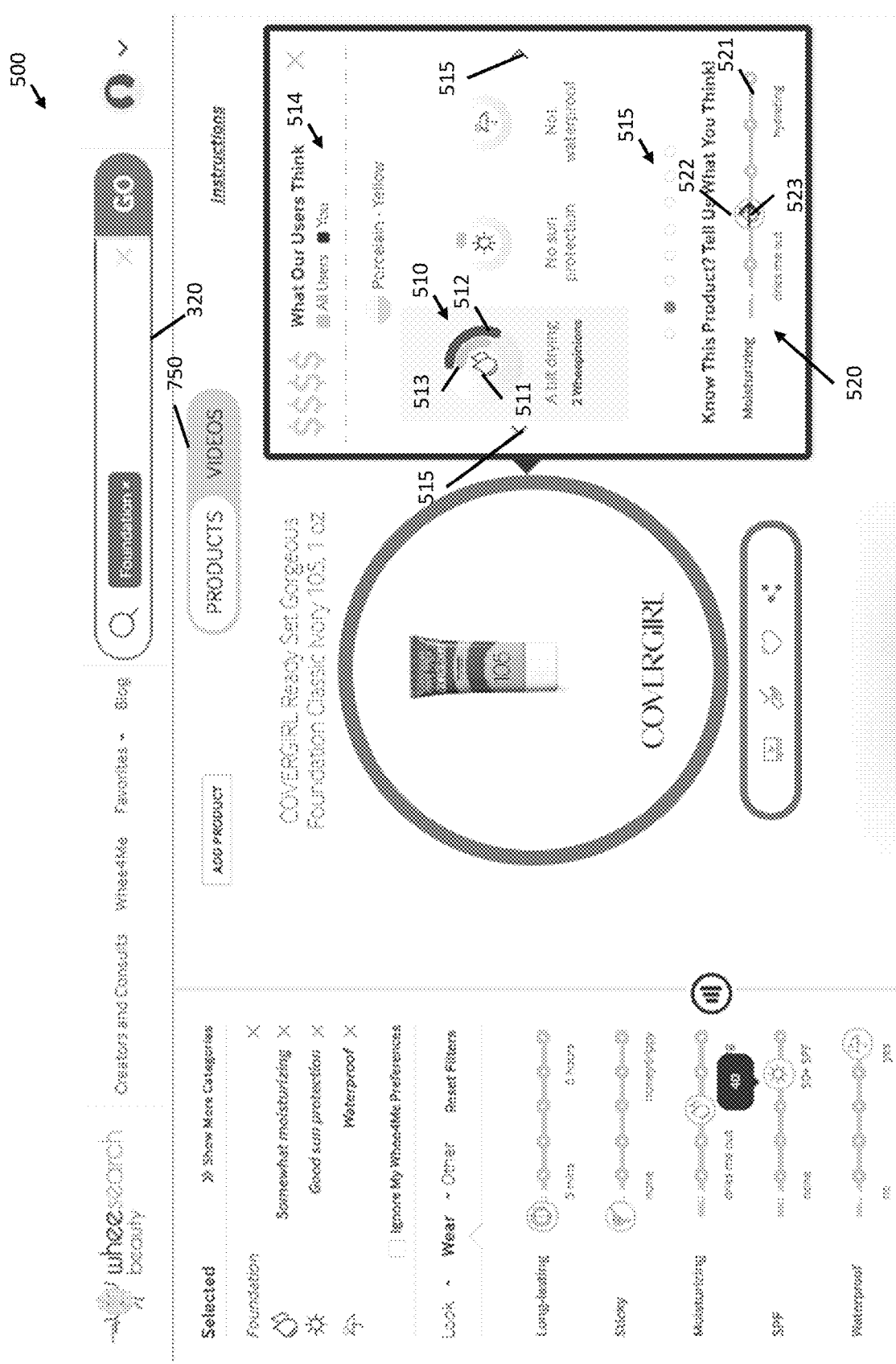
FIG. 5 shows a product GUI in accordance with embodiments of the invention.

As illustrated in FIG. 5, upon a user's selection of one of the products 410 in the product search results GUI 400, the system may present a product GUI 500 that corresponds to the specific product 410 selected by the user. The product GUI 500 may include one or more graphical indicators 510, each graphical indicator 510 corresponding to an attribute of the selected product 410. Each graphical indicator 510 may include an icon 511 that may provide a graphical representation of the particular product attribute to which the graphical indicator 510 corresponds. Product attribute icons 511 associated with graphical indicators 510 displayed in the product GUI 500 may be the same as product attribute icons 423 associated with filter sliders 420 displayed in the product search results GUI 400. This allows users to become familiar with icons 423, 511 displayed by the system, and to easily comprehend information conveyed by graphical indicators 510.

Each graphical indicator 510 may include one or more radial indicators 512, 513, formed by concentric arcs. Such radial indicators 512, 513 reflect values associated with the product attributes to which the graphical indicator 510 corresponds. Such values may be determined based on user opinion information received by the system. In an embodiment related to beauty products, a product GUI 500 for a foundation product may include a graphical indicator 510 corresponding to a moisturizing attribute. A radial indicator 512, 513 having an arc of 90 degrees may indicate that the foundation product is a bit drying, based on the opinions of one or more users, while a radial indicator 512, 513 having an arc of 180 degrees may indicate that the foundation product is somewhat moisturizing, based on the opinions of one or more users. In the embodiment illustrated in FIG. 5, a first radial indicator 512 reflects the opinion of an individual user, while a second radial indicator 513 reflects the average opinion of all users of the system. Distinct radial indicators 512, 513 corresponding to the same product attribute may be distinguished based on their color, shade, or pattern. A legend 514 may be displayed to provide an explanation of various colors, shades, or patterns of distinct radial indicators 512, 513. In accordance with an embodiment, other radial indicators may be displayed to reflect other information, such as the average opinion of a select subgroup of users who have been, for example, identified as creators, consultants, or as having particular knowledge with respect to a type of product or service. For example, a graphical indicator 510 may include three concentric radial indicators, a first radial indicator reflecting an opinion of an individual user, a second radial indicator reflecting an average opinion of all users, and a third radial indicator reflecting an average opinion of creators. The product GUI 500 may incorporate a scrolling feature, having controls 515 that allow a user to view several graphical indicators 510 corresponding to different attributes of a selected product.

In addition, or as an alternative, to displaying radial indicators, the system may display other types of indicators such as bars or other shapes (e.g., a star or a checkmark) having various sizes and/or colors, or various degrees of shading and/or fill. Such indicators may be displayed in connection with icons 511, each of which may be associated with a particular product attribute.

As illustrated in FIG. 5, the product GUI 500 may include a GUI input element, such as a slider 520 corresponding to a particular attribute of the selected product. Sliders 520 corresponding to various attributes may be displayed in response to a user's selection of various graphical indicators 510 in the product GUI 500. For example, by selecting a graphical indicator 510 corresponding to a moisturizing attribute, a user may cause a slider 520 corresponding to the moisturizing attribute to be displayed. A slider 520 includes a track 521 and a handle 522, and may further include an icon 523, which may be displayed on the handle 522. The icon 523 may provide a graphical representation of the particular product attribute to which the slider 520 corresponds. For example, a slider 520 corresponding to a "moisturizing" product attribute may include an icon 523 that resembles water droplets. A slider 520 may allow for a user to input any value within a continuous range between minimum and maximum extremes, or may allow a user to input a value within a set of discrete values between minimum and maximum extremes.

Product attribute icons 523 associated with sliders 520 displayed in the product GUI 500 may be the same as product attribute icons 511 associated with corresponding graphical indicators 510 displayed in the product GUI 500, as well as product attribute icons 423 associated with filter sliders 420 displayed in the product search results GUI 400. This allows users to become familiar with icons 423, 511, 523 displayed by the system, and to easily comprehend information conveyed by graphical indicators 510.

A user may indicate their opinion with respect to a product attribute via a GUI input element, for example, by adjusting a slider 520, that corresponds to that product attribute. Upon a user's indication of their opinion, the system may store a value associated with that opinion in a database 120. Stored user opinion values may be used, for example, to calculate average opinion values, with respect to product attributes, for all users of the system as indicated by graphical indicators 510. Such user opinion values may also influence which products are displayed, and the order in which they are displayed, when a user applies filters in the product search results GUI 400. For example, in an embodiment related to beauty products, a user may adjust a slider 420 to indicate a desire to view products that are particularly long-lasting. In response, the product search results GUI 400 may display products for which the average user opinion value associated with a long-lasting product attribute is particularly high.

Users' profile information, which may also be stored in a system database 120, may also influence which products are displayed, and the order in which they are displayed, in the product search results GUI 400. For example, search results may be influenced by opinion values of other users that have user attributes similar to those of the individual user that initiated the search. Search results may further be influenced by a combination of user attributes, as reflected by a user's profile information, and user preferences, as indicated by the user's input via product attribute filters. In an embodiment related to beauty products, a user exhibiting an attribute of dry skin, as inputted via a user profile GUI 200, may search for foundation products exhibiting a somewhat moisturizing attribute, as indicated via a filter slider 420. In response, a product search results GUI 400 may display products for which other users having dry skin have opined that the product is somewhat moisturizing. In determining which products to display, and the order in which products are displayed, in the search results GUI 400, the opinions of other users having user attributes that are similar to user attributes of the user who initiated the search may have a greater influence than the opinions of other users having user attributes that are not similar to user attributes of the user who initiated the search. A user may, however, provide input to indicate that they wish for the system to ignore their individual user attributes when presenting search results.

In accordance with an embodiment, a user's behavioral data may also influence which products are displayed, and the order in which they are displayed, in the product search results GUI 400. For example, the system may track searches that a user initiates, the products or types of products a user views, selects, or otherwise interacts with, the videos a user views, selects, or otherwise interacts with, and any other actions the user performs in connection with the system. In turn, the system may use such information to determine which products may be of interest to the user, and such products may be displayed, for example, in the product search results GUI 400.

Figure 6:
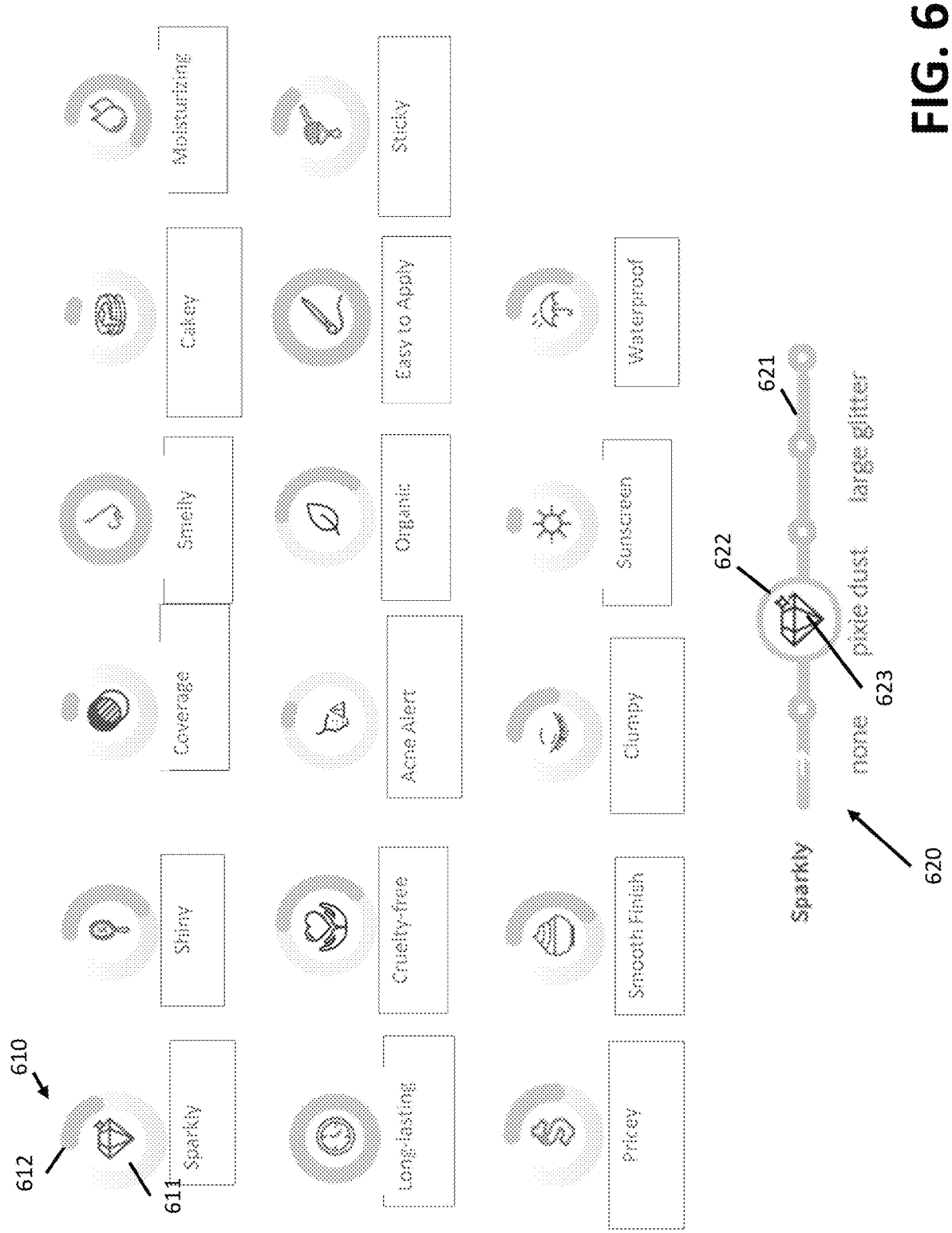
FIG. 6 shows graphical indicators in accordance with embodiments of the invention.

Turning to FIG. 6, illustrated therein are graphical indicators 610 that may be displayed in accordance with embodiments related to beauty products. Each graphical indicator 610 shown in FIG. 6 includes an icon 611 that represents a particular product attribute. For example, an icon 611 that represents a sparkly attribute may resemble a diamond. Each graphical indicator 610 further includes a radial indicator 612 that may partially or completely surround the icon 611. The radial indicator 612 reflects a value associated with the product attribute to which the graphical indicator 610 corresponds. Each radial indicator 612 that is displayed is based on at least one user opinion.

In accordance with an embodiment, radial indicators 612 may be read like a clock. In particular, the length or degree of a radial indicator 612 may be proportional to its value. For example, a radial indicator 612 that extends 180 degrees (e.g., from 12 o'clock to 6 o'clock) may reflect a value that is more than that of a radial indicator 612 that extends 90 degrees (e.g., from 12 o'clock to 3 o'clock), but less than that of a radial indicator 612 that extends 270 degrees (e.g., from 12 o'clock to 9 o'clock). The system may use words such as "somewhat" or "very," as appropriate, to describe various values.

In accordance with an embodiment, multiple concentric radial indicators 612 may be displayed around a single icon 611. In such an embodiment, a first radial indicator may reflect an opinion of an individual user, a second radial indicator may reflect an average opinion of all users, and a third radial indicator may reflect an average opinion of creators. In accordance with an embodiment, radial indicators 612 may reflect the opinions of any group of users. For example, radial indicators 612 may reflect an average opinion of a group of users who share certain user attributes or preferences with one another. Distinct radial indicators 612 corresponding to the same product attribute may be distinguished based on their color, shade, or pattern, and a legend may be displayed to provide an explanation of various colors, shades, or patterns of distinct radial indicators 612.

In addition, or as an alternative, to displaying radial indicators 612, the system may display other types of indicators such as bars or other shapes (e.g., a star or a checkmark) having various sizes and/or colors, or various degrees of shading and/or fill. For example, as an alternative to radial indicators, one or more bars may be displayed alongside one another, and a value associated with a bar may be reflected by its length. As another example, one or more shapes, such as stars, may be displayed alongside one another, and a value associated with a shape may be reflected by its color. Such indicators may be displayed in connection with icons 611, each of which may be associated with a particular product attribute.

Also illustrated in FIG. 6 is a slider 620 that may be used in accordance with embodiments related to beauty products. A slider 620 includes a track 621 and a handle 622, and may further include an icon 623, which may be displayed on the handle 622, or may be displayed elsewhere such that it remains associated with the slider 620. A slider 620 that corresponds to a "sparkly" attribute may have an icon 623 that is the same as an icon 611 associated with a graphical indicator 610 that corresponds to a sparkly attribute. Sliders 620 may be presented to users with words to represent the extremes, words that make clear what those extremes are. For example, for a sparkly attribute, words may make clear that a minimum extreme is "none" while a maximum extreme is "large glitter." Additional words may be presented to represent values within the extremes. For example "pixie dust" may represent a moderate value for a sparkly attribute. When the handle 622 of a slider 620 is moved to a value between its extremes, the system may store the value as a number between 1 and 100, for example. Only one value per combination of product and attribute is stored per user. By storing values selected from within a continuous range, as opposed to storing values selected from a set of discrete values, the system incorporates more specificity, which may allow information, such as search results, that is provided to users to be more personalized.

Figure 7:
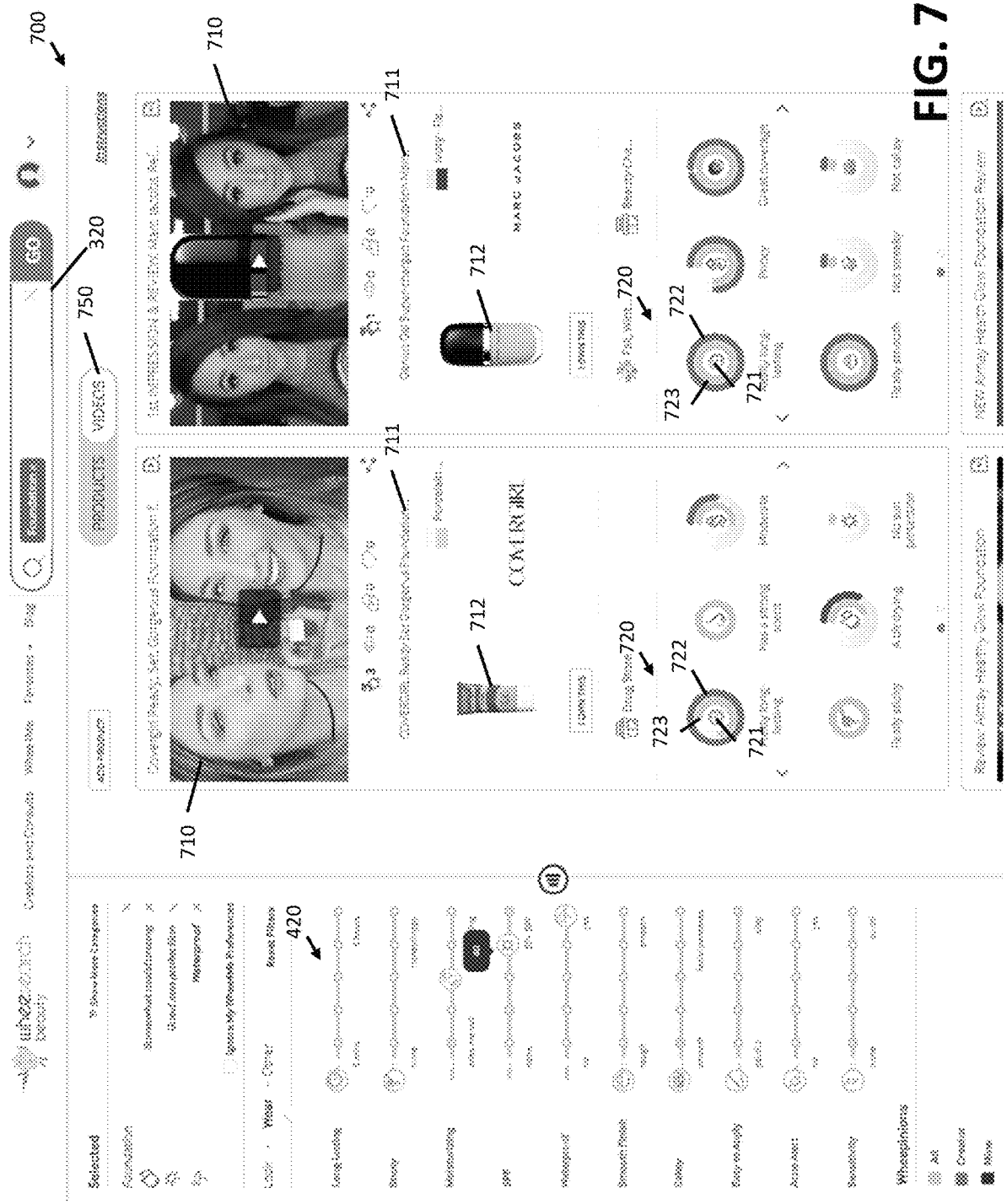
FIG. 7 shows video search results GUI in accordance with embodiments of the invention.

Turning to FIG. 7, illustrated therein is a video search results GUI 700, in accordance with an embodiment. Filters that may be applied to the product search results GUI 400 by way of sliders 420 may also be applied to the video search results GUI 700. The video search results GUI 700 and the product search results GUI 400 may include a GUI input element, such as a toggle switch 750, that allows a user to toggle between views of the video search results GUI 700 and the product search results GUI 400. The video search results GUI 700 may include one or more videos 710 corresponding to products 410 displayed in the product search results GUI 400. Text 711 and an image 712 corresponding to each product 410 may also be displayed in the video search results GUI 700. The video search results GUI 700 may include one or more graphical indicators 720, each graphical indicator 720 corresponding to an attribute of a corresponding product. Each graphical indicator 720 may include an icon 721, a radial indicator, 722, 723, and may be the same as a graphical indicator 510 corresponding to the same attribute of the same product displayed in the product GUI 500. In accordance with an embodiment, a radial indicator 722 may reflect the opinion of an individual creator with respect to a product attribute.

Videos 710 displayed in the video search results GUI 700 may provide information related to corresponding products 410. For example, videos 710 may provide instructions on how to use corresponding products 410. Links to videos displayed in the video search results GUI 700 may be provided to the system by users who have been identified as creators, or users who have particular knowledge with respect to a type of product or service.

Figure 8:
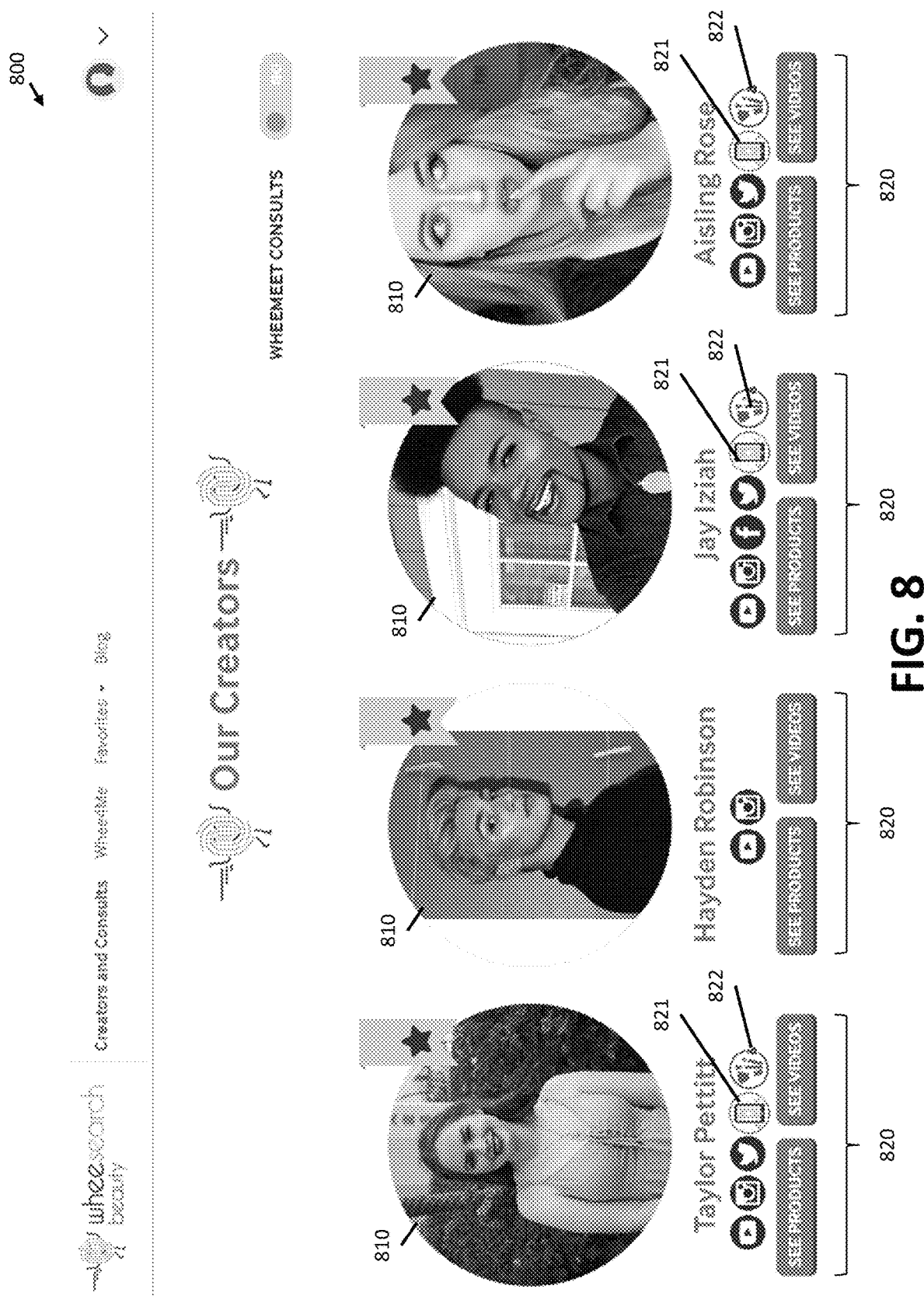
FIG. 8 shows a creator/consultant GUI in accordance with embodiments of the invention.

Turning to FIG. 8, illustrated therein is a creator/consultant GUI 800, in accordance with an embodiment. The creator/consultant GUI 800 may display information about users 810 of the system that have been identified as creators (e.g., users who have created informational content, such as instructional videos, regarding certain products or services) and/or consultants (e.g., users who may be available to offer consultations with other users regarding certain products or services). Identification of a user as a creator may be based on verified association to video content related to products, or to services related to products, that are featured by the system. The system may allow creators to tag products in their videos, or indicate to the system which products are featured in videos that they have created. Consultants may also be creators who have produced video content that is accessible via the system. For each user 810 displayed in the creator/consultant GUI 800, the creator/consultant GUI 800 may display links 820 that allow other system users to access, for example, social media accounts of the creator/consultant user 810, to initiate a search within the system for products that the creator/consultant user 810 owns, likes, or has created informational content for, or to initiate a search within the system for videos created by the creator/consultant user 810. For each user 810 that has been identified as a consultant, the creator/consultant GUI 800 may display a link 821 that allows other users to schedule a consultation with the consultant user 810, and may also display a link 822 that allows other users or to send a monetary tip to the consultant user 810 by entering credit card or other payment information.

Turning to FIG. 9, illustrated therein is a consultation scheduling GUI 900, in accordance with an embodiment. A user may access the consultation scheduling GUI 900 by selecting a link 821 in the creator/consultant GUI 800, or by selecting a link at an external site, such as a social media site of a consultant. The consultation scheduling GUI 900 may include a first portion 910 that may provide information concerning types of consultations, and may allow a user to select a type of consultation. The consultation scheduling GUI 900 may include a second portion 920 that allows a user to select a time and day for their consultation. The system may present the user with a list of potential dates, times, and prices for a consultation, which may be based on information previously provided to the system by a selected consultant. A consultation may include a live video chat session between a user and a consultant. During a consultation, a user may ask, and receive answers to, questions related to the particular products, services, techniques, or other subject matter to which the consultation pertains. In accordance with an embodiment, a live video chat session may be conducted between a consultant and a plurality of other users, or between a plurality of consultants and a plurality of other users.

Figure 10:
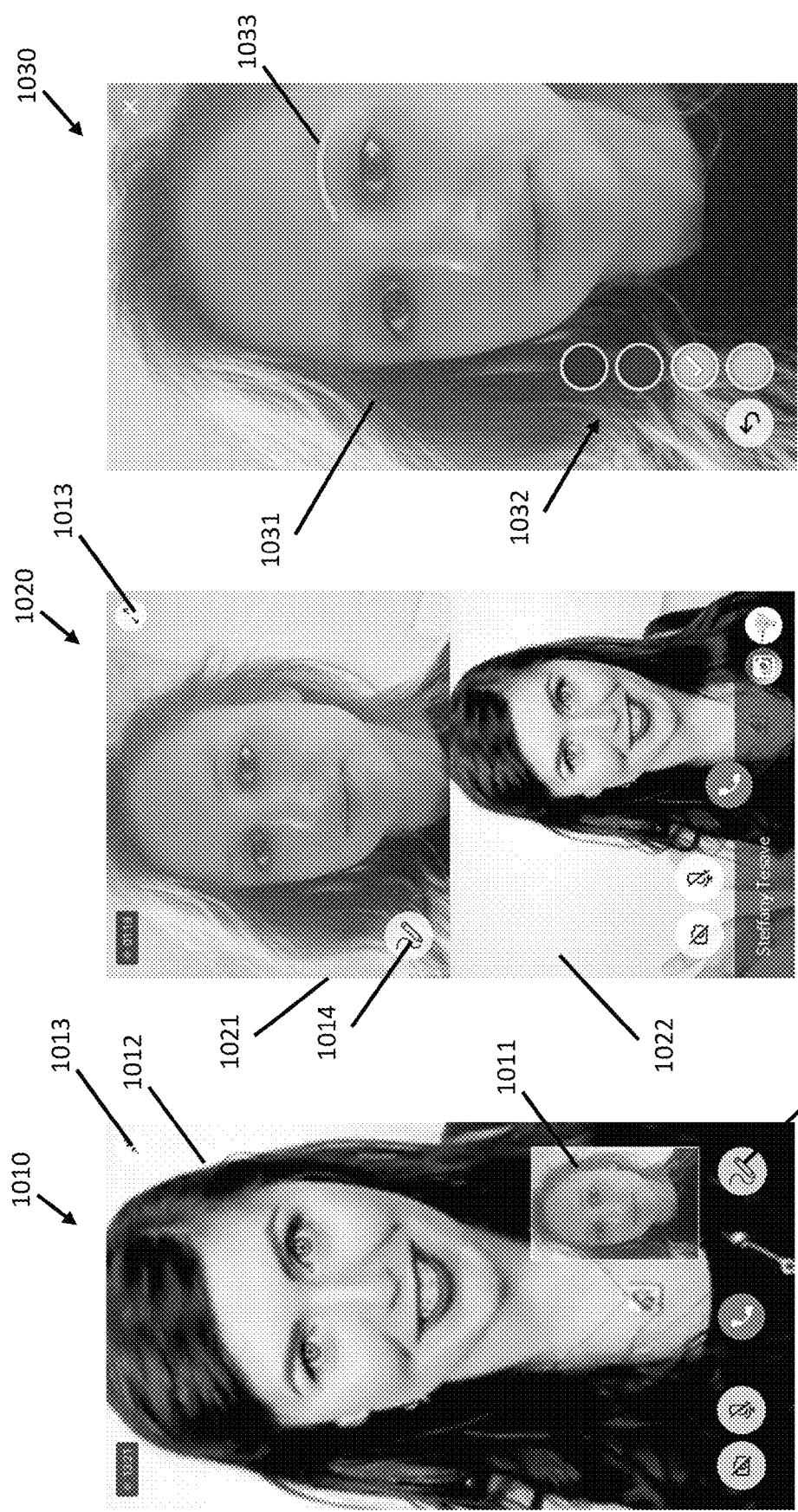
FIGS. 10A, 10B, and 10C show consultation views in accordance with embodiments of the invention.

Turning to FIGS. 10A, 10B, and 10C, illustrated therein are examples of content that may be displayed on user devices, such as mobile devices 131, laptop computers 132, desktop computers 133, or combinations thereof, during a consultation between a user and a consultant in accordance with an embodiment. Shown in FIG. 10A is a picture-in-picture view 1010 that may be displayed on a user's user device during a consultation. The picture-in-picture view 1010 includes a first window 1011, which may include live video of the user. The first window 1011 may be displayed within a larger second window 1012, which may include live video of the consultant. Shown in FIG. 10B is a split-screen view 1020 that may be displayed on a user's user device during a consultation. The split-screen view 1020 includes a first window 1021, which may include live video of the user. The first window 1021 may be displayed adjacent to a second window 1022, which may include live video of the consultant. Both the picture-in-picture and split-screen views may include an icon 1013 that allows a user to switch between the picture-in-picture view 1010 and the split-screen view 1020. Similar picture-in-picture or split-screen views may be displayed on the consultant's user device during a consultation.

In accordance with an embodiment, during a consultation, a user device may display a markup view 1030 as shown, for example, in FIG. 10C. The markup view 1030 may be displayed in response to a user or a consultant's selection of an icon 1014 in the picture-in-picture view 1010 or the split-screen view 1020. The markup view 1030 may include an image 1031, either a live video image of the user, a prerecorded video image of the user, or a still image of the user, which may be a photograph of the user taken immediately before a user device displays the markup view 1030. Both the user's user device and the consultant's user device may display a similar markup view 1030 including the image 1031 of the user. The markup view 1030 may include a palette 1032, which may allow the consultant to select from one or more colors, which the consultant may use to make marks 1033 on the image 1031 of the user. The marks 1033 may be displayed by both the user's user device and the consultant's user device. The markup view 1030 may include other types of drawing or editing tools that may allow a consultant to alter or otherwise interact with an image 1031 of a user. In an embodiment related to beauty products, the markup view 1030 may allow the consultant to make marks 1033 that indicate how and where a user can apply a certain beauty product to themself. In the embodiment of FIG. 10C, a mark 1033 is shown along an user's eyebrow in an image 1031 of the user. Drawing and editing tools, which may be displayed in a palette 1032 along with selectable shades or colors, may be provided to simulate various types of makeup tools, such as pencils, brushes, wands, dusters, sponges, pads, powder puffs, or other applicators. A consultant may use the drawing and editing tools to alter an image 1031 of a user, thereby simulating the application of makeup to the user, and the altered image 1031 may be viewable by both the consultant and the user via their respective user devices. Accordingly, the user may receive live and highly personalized beauty advice and instruction from the consultant. Other embodiments may extend beyond beauty products to other products or services, or may extend to any other topic.

In accordance with an embodiment, the system may provide a user with a virtual look, which allows the user to view a rendering of themself using or wearing a particular product. This allows a user to see what they might look like if they wore a particular beauty product, for example. In accordance with embodiment, a user may identify an image of another person, such as a model or celebrity, using or wearing a particular product, style, or technique. The system may then display an image on the user's device that allows the user to view a rendering of themself using or wearing the same or similar product, style, or technique. Products may include various makeup, clothing, or accessory items. Styles may include various styles of makeup, clothing, or hair. Techniques may include various manners of applying products or styles. In accordance with embodiment, the system may display an image on the user's device that allows the user to view a rendering of themself using or wearing a product, style, or technique in various virtual settings such as during the daytime, during the nighttime, indoors, outdoors, or at other times or locations in which circumstances, such as lighting conditions may vary.

In accordance with an embodiment, in addition, or as an alternative, to allowing users to make marks 1033 on images 1031 of users (marks 1033 that may be viewed by multiple users during a live video chat session), and in addition, or as an alternative, to providing a user with a virtual look, the system may allow users to alter images 1031 or to perform interactions with images 1031 of other users, or of products. The system may further allow users to apply special effects to images 1031. Such images 1031 may include video, including live video, or still images, and the results of such alterations or interactions may be viewed by multiple users during a live video chat session. Accordingly, the system may incorporate augmented reality.

In accordance with an embodiment, a consultant may participate in a one-on-one consultation session with a user. In accordance with another embodiment, a single consultant may participate in a class-type consultation session with several users simultaneously. In accordance with another embodiment, a single consultant may participate in an event-type session in which the consultant livestreams video to many users (e.g., hundreds or thousands) simultaneously. In accordance with another embodiment, several consultants may participate in an event-type session in which the consultants livestream video to several or to many users (e.g., hundreds or thousands) simultaneously.

Figure 11:
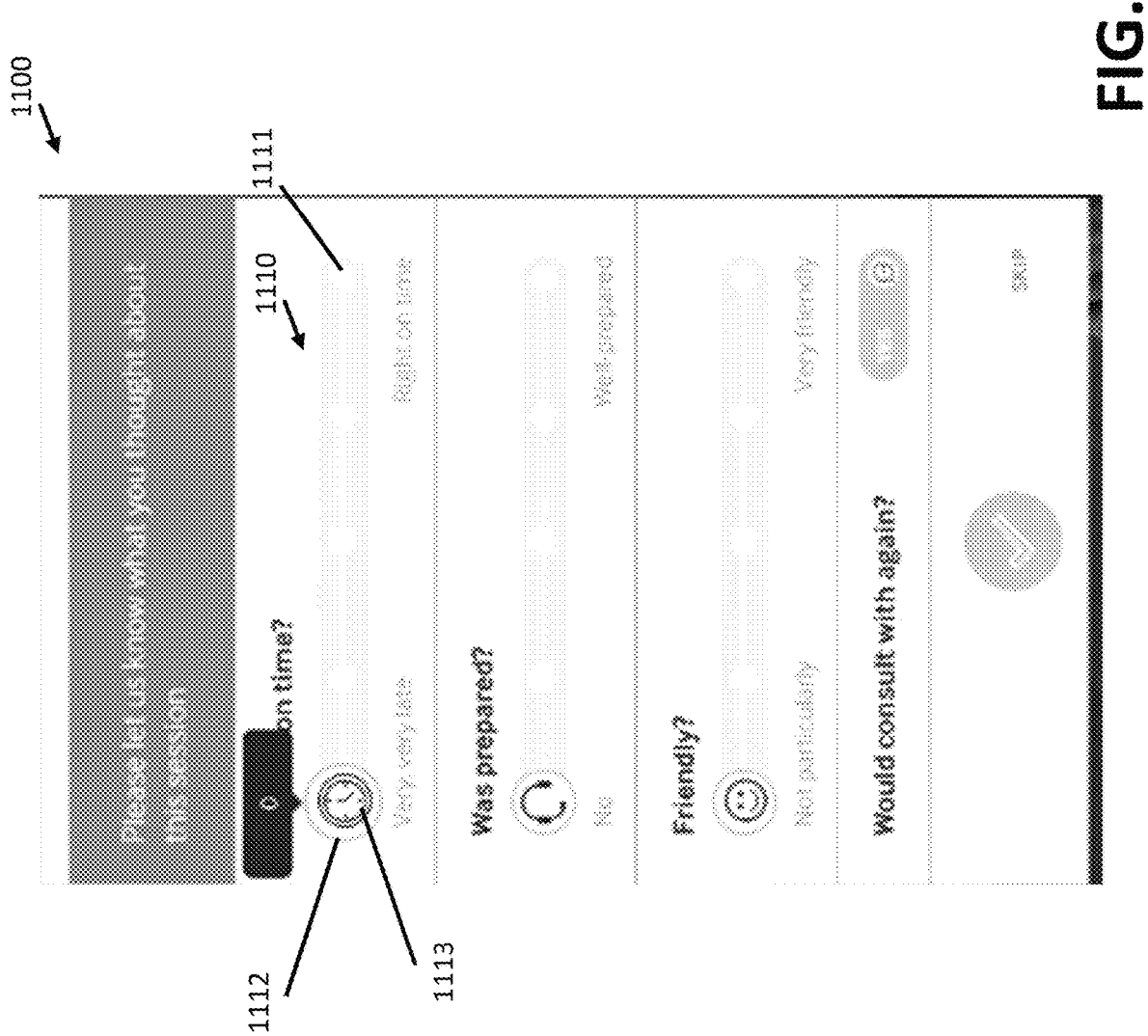
FIG. 11 shows a survey GUI in accordance with embodiments of the invention.

Turning to FIG. 11, illustrated therein is a survey GUI 1100, in accordance with an embodiment. Following a consultation, a user may access a survey GUI 1100 to provide opinions regarding the particular consultant with whom the user consulted. The survey GUI 1100 may include GUI input elements, such as sliders 1110, each of which may correspond to a particular attribute of the consultant. A slider 1110 includes a track 1111 and a handle 1112, and may further include an icon 1113, which may be displayed on the handle 1112. The icon 1113 may provide a graphical representation of the particular consultant attribute to which the slider 1110 corresponds. Examples of consultant attributes include the punctuality of the consultant, the preparedness of the consultant, and the friendliness of the consultant. A slider 1110 may allow for a user to input any value within a continuous range between minimum and maximum extremes, or may allow a user to input a value within a set of discrete values between minimum and maximum extremes. Opinions received from a user via the survey GUI 1100 may be stored by the system in a database 120. Similarly, a consultant may access a survey GUI 1100 to provide opinions regarding a particular user following a consultation. The system may display graphical indicators reflecting users' opinions of consultants. For example, the system may display, in the creator/consultant GUI 800, graphical indicators having icons that are the same as icons displayed in the survey GUI 1100, and having indicators, such as radial indicators, which reflect users' opinions with respect to consultant attributes. Similarly, the system may display graphical indicators having icons that are the same as icons displayed in the survey GUI 1100, and having indicators, such as radial indicators, which reflect consultants' opinions with respect to user attributes. In accordance with an embodiment, a user of any type may be able to provide their opinions with respect to any other user, or any product, video, comment, or other aspect of the system. In accordance with an embodiment, the survey GUI 1100 may include GUI input elements such as text boxes, radio buttons, check boxes, and drop down menus that may allow a user to provide information in a manner similar to that described above with respect to the user profile GUI 200.

In an embodiment, a user may select from links that allow the user to view favorite items, such as particular videos that the user has liked or found helpful, or particular products that the user has liked, owned, provided an opinion on, or added to the system. Such favorite items may be displayed, for example, in the video search results GUI 700 or the product search results GUI 400.

It should be recognized that the various GUIs described herein may be displayed separately or in combination with each other. In accordance with an embodiment, a GUI may include, in combination, aspects of two or more of the various GUIs described herein. Furthermore, multiple GUIs may be displayed simultaneously by a user device.

Figure 12:
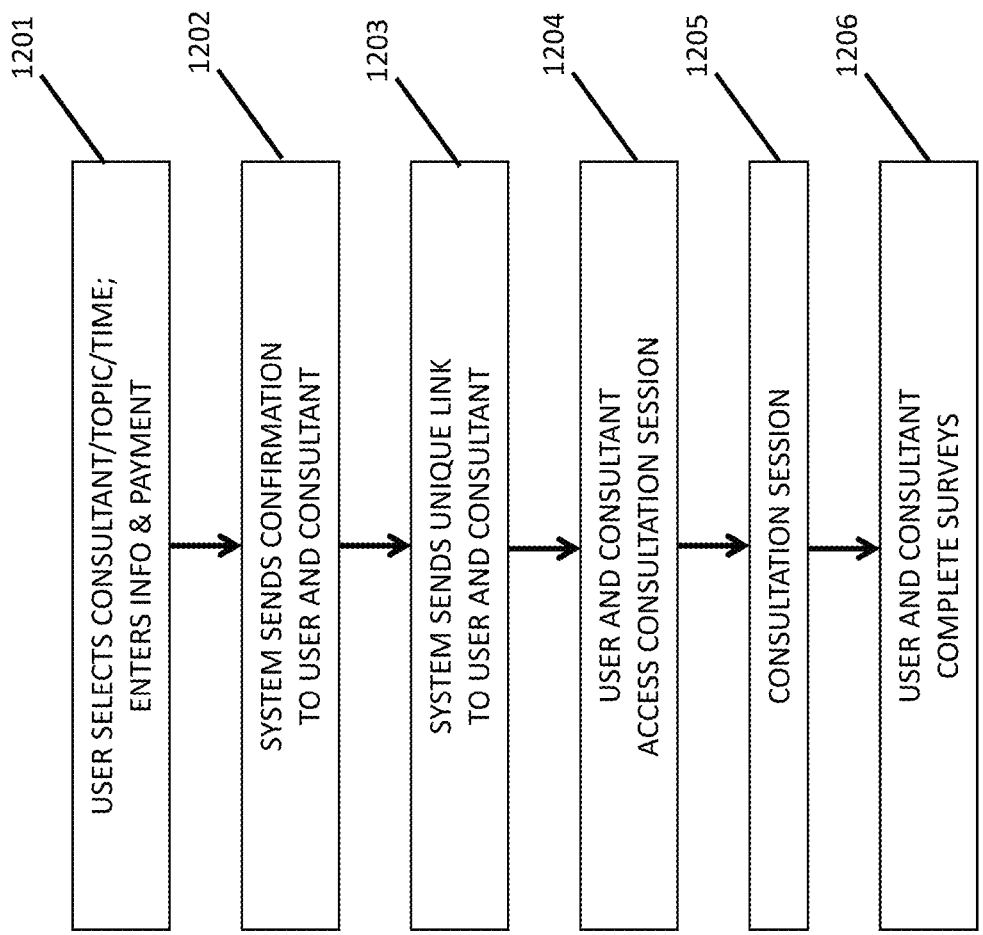
FIG. 12 shows a consultation process in accordance with embodiments of the invention.

Turning to FIG. 12, illustrated therein is a process by which a consultation between a user and a consultant may be conducted in accordance with an embodiment. At step 1201, a user signs up for a consultation session. During step 1201, the user may select a consultant for the session, a topic for the session, and a date and time for the session, and may also enter contact information (e.g., email address and phone number) and payment information. The system may present a creator/consultant GUI 800 and a consultation scheduling GUI 900, which may facilitate the receipt of information from the user during step 1201. The system may store user selections, contact information, and payment information in a database 120. Accordingly, consultants may monetize the system by offering consultation sessions.

At step 1202, the system sends confirmation to the user and selected consultant, informing them of the topic, date, and time of the consultation session. The system may, for example, send confirmation to the user and the consultant via email messages or text messages. Such confirmation may include information regarding items that the user or the consultant should bring to the consultation session.

Step 1203 may be performed on the day of the consultation session, at or shortly before the scheduled time of the consultation session. At step 1203, the system sends a unique link to the user and the consultant that will allow them to join the consultation session. The system may, for example, send the unique link to the user and consultant via text messages to the mobile devices of the user and the consultant.

At step 1204, the user and consultant access the unique links sent by the system and the consultation session begins. Step 1204 may require the user and the consultant to, for example, tap the screens of their mobile devices 131 and allow access to their device's camera and speakers in order to begin the consultation session.

At step 1205, a consultation session is conducted. The consultation session may be conducted in a manner consistent with the above description of FIGS. 10A, 10B, and 10C. During the consultation session, a user may select between various views, such as a picture-in-picture view 1010 or a split-screen view 1020, a consultant may provide instruction by altering or interacting with images (such as marking an image 1031 displayed in a markup view 1030), and the user and consultant may communicate in real time, asking questions and providing information. During step 1205, the system may also provide the user with links to access various information such as a service provider website, a product website, or a consultant website or social media account. The system may record consultation sessions, and recordings may, for example, be reviewed by system administrators in order to improve services provided by the system. Recordings may also be provided to users or consultants under appropriate circumstances. Payment may also be processed during step 1205. Rules may be established for when payment is processed. For example, payment may be processed 10 minutes after the scheduled start time of a consultation session.

At step 1206, following completion of the consultation session, the user and consultant may complete surveys in connection with the consultation session. The system may present survey GUIs 1100, which may facilitate the receipt of information from the user and the consultant during step 1206. The system may store opinions provided via surveys in a database 120. At step 1206, the system may prompt the user to provide a monetary tip for the consultant, and the user may do so upon the entry of payment information, or the authorization to use previously stored payment information.

Figure 13:
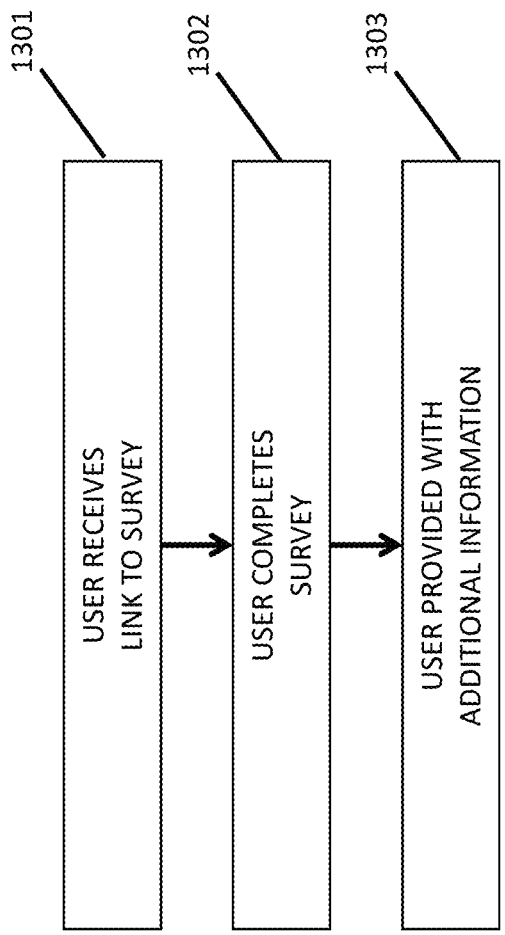
FIG. 13 shows a survey completion process in accordance with embodiments of the invention.

Turning to FIG. 13, illustrated therein is a process by which a user may complete a survey in accordance with an embodiment. At step 1301, the system sends a link to user, the link allowing the user to access a survey. At step 1302, upon accessing the survey, the user completes the survey by providing input concerning the user's opinions. The survey may be conducted in a manner consistent with the above description of FIG. 11. The survey may allow a user to provide opinions concerning a particular consultant, or to provide opinions concerning a particular product or service. A user may, for example, complete a survey concerning a particular consultant following a consulting session with that consultant. A user may, for example, complete a survey concerning a particular product after indicating that they own that product. The system may store opinions provided via surveys in a database 120. At step 1303, upon completion of the survey by the user, the system may provide the user with additional information (e.g., product information) that the system determines may be of interest to the user based on the user's opinions, the user's profile information, or both. For example, the system may direct the user to opinions provided by other users concerning products in which the user has shown interest; or may prompt the user to schedule a consultation session concerning products, or techniques for using products, in which the user has shown interest. Furthermore, the system may periodically send information (e.g., via text message) concerning events, product releases, etc. based on the user's opinions, the user's profile information, or both.

Embodiments described herein relate to providing and receiving information related to products. Embodiments described herein further relate to providing and receiving information related to beauty products. However, the systems and methods described herein are not limited to beauty products, nor are they related to products in general. Rather, the systems and methods described herein may be applied to products or services, to individuals or entities that provide or perform such products or services, (all such things are collectively referred to herein as "items"), or to any situation involving the rating of things. For example, in a real estate context, a user may provide information concerning user attributes such as home buying experience, communication style, financing status, transportation preferences, etc. Users may search for realtors, and the system may provide results based on opinions of other users having attributes similar to that of the user that initiated the search. Users may provide opinions with respect to realtor attributes such as expertise with first-time buyers, responsiveness, helpfulness, expertise with respect to a particular geographic area, etc., and users may filter realtor search results based on those attributes, which may be conveyed to users in the form of graphical indicators. Users may also search for homes, and the system may provide results based on opinions of other users having attributes similar to that of the user that initiated the search. Users may provide opinions with respect to home attributes such as storage space, garden size, kitchen quality, etc., and users may filter home search results based on those attributes, which may be conveyed to users in the form of graphical indicators. In other examples, a user may schedule a consultation session to learn about subjects such as calculus, cooking, or building a workbench, for example. Additional examples will be apparent in view of the descriptions and drawings provided herein.

The systems and methods described herein may incorporate computer hardware, including displays for presenting information, input devices for receiving information, processors for executing instructions, and storage devices for storing instructions and data. The systems and methods described herein may incorporate computer software, stored on computer readable media, including instructions that, upon execution, provide the functionality of the described systems and methods. The systems and methods described herein may incorporate components that communicate with one another via wired or wireless connections, or a combination thereof, and such communications may take place over a network such as the Internet.

It should be recognized that certain components or elements of the embodiments described above, or in the claims that follow, are numbered to allow ease of reference to them or to help distinguish between them, but order should not be implied from such numbering, unless such order is expressly recited. The above description and drawings are only to be considered illustrative of specific embodiments, which achieve the features and advantages described herein. Accordingly, the embodiments in this patent document are not considered as being limited by the foregoing description and drawings.

What is claimed is:

1. A computer implemented system comprising:
a first graphical user interface configured to allow a first user to establish a live video session between the first user and a second user,
wherein during the live video session, the first user may view live video of the second user on a first user device,
wherein during the live video session, the second user may view live video of the first user on a second user device,
wherein during the live video session, the second user may make alterations to an image of the first user via the second user device, and
wherein, during the live video session, the first user may view the alterations made to the image of the first user via the first user device,
wherein during the live video session, the first user may view a rendering of themselves using or wearing a particular product, style, or technique in a virtual setting, and wherein the virtual setting is associated with a time of day or a location.

2. The system of claim 1, wherein making alterations to an image of the first user includes drawing a mark on the image of the first user.

3. The system of claim 1, wherein making alterations to an image of the first user includes applying a color to the image of the first user.

4. The system of claim 1 further comprising a second graphical user interface which includes:
a plurality of graphical user interface input elements, each graphical user interface element corresponding to an attribute of the first user or the second user; and
a plurality of graphical indicators, each graphical indicator corresponding to one of the attributes of the first user or the second user.

5. The system of claim 4, wherein each graphical user interface input element is configured to allow the first user to input a first value associated with the corresponding attribute of the second user, or wherein each graphical user interface input element is configured to allow
the second user to input a first value associated with the corresponding attribute of the first user; and
wherein each graphical indicator reflects the first value associated with the corresponding attribute.

6. The system of claim 5, wherein each graphical user interface input element comprises a slider.

7. The system of claim 5, wherein each graphical indicator comprises a radial indicator that reflects the first value associated with the corresponding attribute.

8. The system of claim 5, wherein each graphical user interface input element comprises a slider having an icon that represents the corresponding attribute;
wherein each graphical indicator comprises an icon that represents the corresponding attribute; and
wherein each graphical indicator comprises a radial indicator that reflects the first value associated with the corresponding attribute.

* * * * *